(12) United States Patent
Volanthen et al.

(10) Patent No.: US 8,545,179 B2
(45) Date of Patent: Oct. 1, 2013

(54) STRUCTURAL MONITORING OF WIND TURBINE WITH FIBRE BRAGG GRATING SENSORS IN EACH BLADE

(75) Inventors: Mark Volanthen, Southampton (GB); Philip Mark Rhead, Southampton (GB); Martin Peter William Jones, Southampton (GB); Glynn David Lloyd, Southampton (GB)

(73) Assignee: Moog Insensys Limited, Fareham, Hampshire (GB)

( * ) Notice: Subject to any disclaimer, the term of this patent is extended or adjusted under 35 U.S.C. 154(b) by 828 days.

(21) Appl. No.: 12/377,957

(22) PCT Filed: Aug. 20, 2007

(86) PCT No.: PCT/GB2007/003176
§ 371 (c)(1),
(2), (4) Date: Apr. 26, 2010

(87) PCT Pub. No.: WO2008/020239
PCT Pub. Date: Feb. 21, 2008

(65) Prior Publication Data
US 2010/0209248 A1    Aug. 19, 2010

(30) Foreign Application Priority Data

Aug. 18, 2006 (GB) .................................. 0616503.9

(51) Int. Cl.
*F03D 11/00* (2006.01)
(52) U.S. Cl.
USPC ........................ 416/61; 416/146 R; 416/230

(58) Field of Classification Search
USPC ......... 415/118; 416/61, 146 R, 230; 285/12, 285/37; 359/326
See application file for complete search history.

(56) References Cited

U.S. PATENT DOCUMENTS

| 4,297,076 A | 10/1981 | Donham et al. |
| 5,680,489 A * | 10/1997 | Kersey ............................ 385/12 |
| 6,201,912 B1 * | 3/2001 | Kempen et al. ................. 385/37 |
| 6,940,186 B2 * | 9/2005 | Weitkamp ....................... 290/44 |
| 7,726,942 B2 * | 6/2010 | Mortensen et al. .............. 416/5 |
| 2001/0048071 A1 | 12/2001 | Holz et al. |
| 2005/0276696 A1 | 12/2005 | Lemieux |
| 2006/0034569 A1 * | 2/2006 | Shih et al. ....................... 385/39 |

FOREIGN PATENT DOCUMENTS

| EP | 1359321 | 11/2003 |
| WO | 99/24790 | 5/1999 |
| WO | 2004/056017 | 7/2004 |
| WO | 2005/071382 | 4/2005 |

* cited by examiner

*Primary Examiner* — Ninh H Nguyen
(74) *Attorney, Agent, or Firm* — Renner, Otto, Boisselle & Sklar, LLP

(57) ABSTRACT

A system for the structural monitoring of blades 1 on a wind turbine. Each blade 1 has respective optical fiber bragg grating sensors 5. The system has a number of input connectors, which connect to the strain sensors 5 of respective blades 1. A single output connector connects to a data processing device 3 which processes signals from the strain sensors 5. The input connectors each have a signal path to the output connector that is different in length to the signal path from the other input connectors, such that signals from a given blade 1 can be identified at the data processing device 3 by the time of arrival of the signals. The system has the advantage that the each of the blades 1, including the sensors attached to it or embedded within it can be identical and therefore interchangeable.

6 Claims, 2 Drawing Sheets

STRUCTURAL MONITORING OF WIND TURBINE WITH FIBRE BRAGG GRATING SENSORS IN EACH BLADE

This application is a national phase of International Application No. PCT/GB2007/003176 filed Aug. 20, 2007 and published in the English language.

FIELD OF THE INVENTION

This invention relates to the structural monitoring of wind turbine blades and, in particular, to the structural monitoring of wind turbine blades using fibre optic sensors. The invention extends to a method of manufacturing a wind turbine.

BACKGROUND TO THE INVENTION

Blades for wind turbines are typically constructed of glass-reinforced plastics (GRP) on a sub-structure, which may be formed of wood, glass fibre, carbon fibre, foam or other materials. Graphite fibre in epoxy resin is also used. The plastics resin can be injected into a mould containing the sub-structure to form the outer surface of the blade. The blade may also be built up as a series of layers of fibre material and resin. In some cases, the fibre material is pre-impregnated with resin.

A typical wind turbine blade may have a length of between 20 and 60 metres or more. As the interior of the blade is generally hollow, a "floor" is provided within the blade proximate the hub-engaging end of the blade. The blade floor is a bulkhead about 0.5 metres to 2.5 metres into the blade that prevents service personnel falling into a blade while working in the hub.

It is known, for example from U.S. Pat. No. 4,297,076, to provides the blades of a wind turbine with strain gauges and to adjust the pitch of portions of the blades in response to the bending moment on the blades measured by the strain gauges. Optical fibre strain sensors are known and WO 2004/056017 discloses a method of interrogating multiple fibre Bragg grating sensors forming an array along a single fibre. In the system of WO 2004/056017, Bragg gratings are defined in the optical fibre at spaced locations along the optical fibre. When the optical fibre is put under strain, the relative spacing of the planes of each Bragg grating changes and thus the resonant optical wavelength of the grating changes. By determining the resonant wavelength of each grating, a strain measurement can be derived for the location of each grating along the fibre. Optical strain sensors operating on the principle of back scattering which do not require discrete gratings along the fibre are also known.

The weight of turbine blades made on the same production line varies slightly from blade to blade. Consequently, the three turbine blades that typically make up a single turbine are carefully selected to have similar weights to ensure the turbine is properly balanced. Most optical fibre strain sensor systems are wavelength division multiplexed (WDM). Each sensor in the same array is identified in the reflected signals from the sensor array by its wavelength. Each sensor must therefore have a different wavelength at all times from other sensors in the same array. If the sensors in each of the three blades of a wind turbine are to be processed as a single array, each blade must contain sensors with resonant wavelengths in different wavelength bands so that each sensor of the complete, three blade array always has a characteristic wavelength. This imposes limitations on the selection of turbine blades in that the blade must be selected both to have the appropriate weight for a balanced turbine and the appropriate wavelength of sensors to prevent ambiguity in the sensor signals. Consequently, the blades of a typical optical fibre sensor system might be categorised into three types, e.g. A, B and C, each having a distinct set of sensor wavelengths. Each turbine requires one of each type of blade for the sensor system to operate correctly, and this significantly complicates blade selection for balancing turbines and maintaining an appropriate inventory of spare blades.

This invention, at least in its preferred embodiments, seeks to provide a scheme for implementing optical fibre sensors in turbine blades in a way that allows any blade to be selected with any other blades for use together on a turbine. It also allows a single spare blade to be used to replace any other blade should the need arise.

SUMMARY OF THE INVENTION

Viewed from a first aspect, this invention provides a method of manufacturing a wind turbine. The method comprises:

providing a group of wind turbine blades, each blade comprising an optical fibre, each optical fibre incorporating a plurality of optical fibre Bragg grating sensors, with each of the sensors within a single fibre having a resonant wavelength in a distinct wavelength band, and at least some of the sensors in different fibres having a resonant wavelength in the same wavelength band;

selecting from the group of wind turbine blades a sub-group of wind turbine blades and assembling the sub-group of wind turbine blades together to form a wind turbine;

connecting each of the optical fibres of the wind turbine to a data processing device via a multiplexer and an optical output, wherein the data processing device is configured to process signals from fibre Bragg grating sensors and the multiplexer is configured to control the passage of signals from the optical fibres to the data processing device, such that signals from only one optical fibre are received at the data processing device at any given time.

Thus, according to the invention, the signals from each optical fibre can be identified at the optical output by their time of arrival. In this way, it is not necessary for the signals themselves to be identifiable as originating from a particular optical fibre, for example by virtue of the wavelength band of the optical signals, in order for the data processing device to determine from which optical fibre the signals originate. Consequently, each turbine blade may be substantially identical, because the signals from each turbine blade can be distinguished by the time of arrival of the signals at the optical output. This allows, for example, each optical fibre to include optical fibre Bragg grating sensors having the same selection of wavelength bands. Indeed each optical fibre may be substantially identical.

In particular embodiments of the invention, therefore, the optical fibres of each turbine blade in the group are substantially identical in terms of the resonant wavelengths of the sensors in the fibre.

Viewed from a further aspect, the invention provides apparatus for the structural monitoring of a plurality of blades on a wind turbine. The apparatus comprises a plurality of optical fibres each for association with a respective turbine blade. Each optical fibre incorporates a plurality of optical fibre Bragg grating sensors and each sensor within a single fibre has a resonant wavelength in a distinct wavelength band (i.e. each sensor of the optical fibres has a resonant wavelength in a different wavelength band to each other sensor in the optical fibre). The apparatus further comprises an optical output, which is connectable to a data processing device configured to process signals from fibre Bragg grating sensors and which has a signal path to each of the optical fibres. The apparatus also comprises a multiplexer in the signal path between the optical output and the optical fibres. The multiplexer is configured to control the passage of signals from the optical fibres to the optical output, such that signals from only one optical fibre are received at the optical output at any given time.

The multiplexer may comprise a selector switch, which selectively connects a particular optical fibre to the optical output at the appropriate time. Alternatively, the multiplexer may comprise a respective switch connected to each optical fibre, which selectively opens or closes the optical connection between the optical fibres and optical output. Such arrangements are not, however, preferred.

In a preferred configuration, the multiplexer comprises a signal path from each optical fibre to the optical output that is different in length to the signal path from the other optical fibres, such that signals from a given optical fibre can be identified at the optical output by the time of arrival of the signals. In this way, the signals from the respective optical fibres are, in effect, time-division multiplexed at the optical output, without any switching being required.

The signal path between the optical fibres and the optical output may be provided by a suitable connection, such as an optical fibre or cable. In a simple embodiment, the length of the signal path is determined by the length of the cable. The cable may be coiled or otherwise arranged in order to provide the required length of the signal path in relatively compact space. The signal path between at least one optical fibre and the optical output may comprise at least one delay coil of optical fibre to provide a predetermined length to the signal path. Thus, delay devices, such as delay coils may be provided within the signal path to provide the required path length. The required length of signal path may be provided by the use of an alternative delay device. For example, the signal path may include regions of varying refractive index in order to alter the speed of light between the optical fibres and the optical output.

Typically the fibre Bragg gratings are strain sensors. However, some of the fibre Bragg gratings may be configured as temperature compensation sensors. The signal path between the optical fibres and the optical output may be formed by optical fibre or another optical medium.

In general, the signal path between the optical fibres and the optical output provides not only a signal path for signals from the fibre Bragg gratings, but also a signal path for signals from the data processing device to the fibre Bragg gratings. In the case of optical fibre Bragg gratings, such signals are typically pulses of light that are reflected by the gratings of the sensors. In this case, signals originating from the optical output travel along the signal path in one direction on their outward journey and return in the opposite direction once reflected. This means that where a delaying signal path is used, it is only necessary for the length of the signal path to be half that required to produce the necessary temporal spacing of the signals received at the optical output. In other words, the delay produced by the signal path is, in effect, applied twice to the signals received at the optical output. A continuous light source may also be used in the context of the invention.

It is also possible for the multiplexer to generate the input light pulses for the optical fibres. For example, the multiplexer may be provided with a respective light source for each optical fibre, such that only one fibre is illuminated at any given time.

The optical output may be provided by a suitable optical connector. Alternatively, the optical output may be simply an identifiable point in continuous optical cabling. The connection between the multiplexer and the optical fibres may be provided by a suitable optical connector. The multiplexer may be located physically within a housing that contains the data processing device. In this case, the housing containing the data processing device may include connectors for a plurality of optical fibres from respective turbine blades, with delay coils, for example, located within the housing. Alternatively, the housing containing the data processing device may include only a connector that forms the optical output.

The data processing device may be configured to identify the signals from each optical fibre strain sensor within a single optical fibre by reference to the wavelength of the light reflected by the strain sensor. In other words, the signals from the optical fibre Bragg gratings in each optical fibre may be wavelength division multiplexed. However, this is not necessary. The data processing device may be configured to identify the signals from each optical fibre strain sensor within a single optical fibre by reference to the time of flight of the light reflected by the strain sensor. In other words, the signals from the optical fibre Bragg gratings in each optical fibre may be time division multiplexed. In this case, the different wavelengths of the optical fibre Bragg gratings within each optical fibre may serve a purpose other than identifying the particular sensor in the reflected signals. For example, the different wavelengths may be chosen for effective power management.

The signal path from the optical fibres to the optical output may include a single branching point at which the signal paths from all of the optical fibres meet. Alternatively, the signal path may include multiple branching points. For example, each branching point may connect two signal paths and one or both of the signal paths may itself be formed from the joining of other signal paths. In this way, each optical fibre can be connected to the optical output via one or more branching points. Each branching point may connect a signal path that includes a delay device, such as a delay coil, to a second signal path that is shorter than the first signal path. In this way, the required length of signal path for each optical fibre can be built up using multiple branching points.

The invention extends to a group of wind turbine blades comprising apparatus according to the invention with each turbine blade comprising a respective optical fibre.

BRIEF DESCRIPTION OF THE DRAWINGS

An embodiment of the invention will now be described by way of example only and with reference to the accompanying drawings, in which.

DETAILED DESCRIPTION OF AN EMBODIMENT

Figure 1:
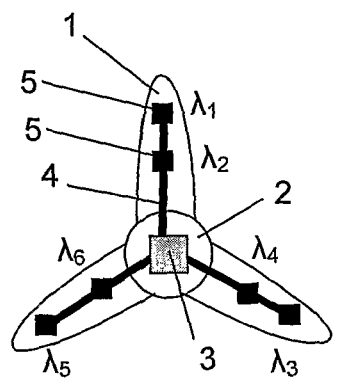
FIG. 1 is a schematic view of a wind turbine incorporating optical fibre strain sensors for structural monitoring.

FIG. 1 is a schematic view of a wind turbine incorporating optical fibre strain sensors for structural monitoring. The turbine comprises three blades 1 connected to a hub 2. Located within the hub 2 is a data processing device (instrument) 3 which sends and receives pulses of light to and from optical fibre strain sensors 5 mounted to each of the blades 1. The optical fibre strain sensors 5 are connected to the instrument 3 by optical fibres 4. When the blades 1 flex in the wind, the resonant wavelength of the Bragg gratings forming the strain sensors 5 changes and from this change in resonant wavelength, the strain on the blade 1 can be determined.

Figure 2:
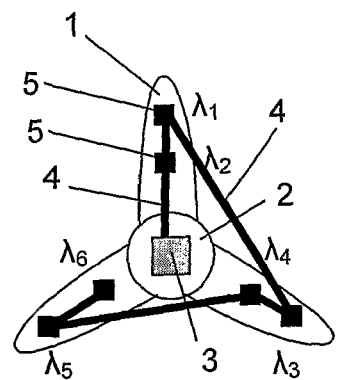
FIG. 2 is a schematic view of a wind turbine incorporating optical fibre strain sensors for structural monitoring in an alternative connection arrangement.

A typical optical fibre sensor system uses wavelength division multiplexing (WDM) to accommodate the signals from each strain sensor 5 along the optical fibre 4. Each sensor in the same array is identified by its wavelength λ and must therefore have a different wavelength at all times from other sensors 5 in the same array. Two types of configuration are possible with this type of sensor system. The first type of configuration is illustrated in FIGS. 1 and 2 and uses sensors 5, each of a different wavelength $\lambda_1$ to $\lambda_6$ in each blade 1. The blades 1 are connected either directly to the instrument 3 in a star configuration by optical fibres 4, as shown in FIG. 1 or daisy-chained as in FIG. 2.

Figure 3:
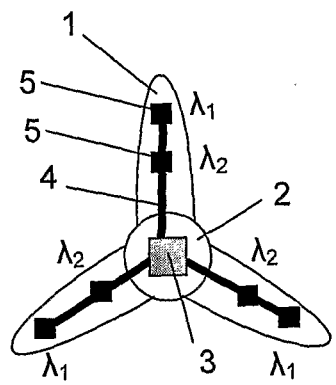
FIG. 3 is a schematic view of a wind turbine incorporating optical fibre strain sensors for structural monitoring in a further alternative connection arrangement.

The second type of configuration use blades with sensors having identical wavelengths $\lambda_1$ and $\lambda_2$ in each blade 1, as shown in FIG. 3. The sensors are made distinguishable using a switch (not shown) to connect one blade at a time to the instrument 3. This is not a preferred solution for two reasons. Firstly, the switch speed is generally too slow, since switches typically take 10 ms to 50 ms to settle and the wind industry typically requires a measurement from each sensor every 30 ms (33 Hz acquisition rate per sensor). Secondly, the reliability of switches is not sufficient for the 20 year life generally required of turbines. The desired data rate requires 90 switch operations per second, equating to over 5,000 million switch operations over 20 years and no switch has currently demonstrated sufficient reliability.

According to embodiments of the invention, a WDM optical fibre sensor system can use the time of flight of optical pulses to distinguish sensors in the same wavelength band from different blades. This can be considered to be a hybrid combination of wavelength division multiplexing and coarse time division multiplexing, i.e. wavelength division multiplexing identifies the particular sensor in the optical fibre and time division multiplexing identifies the particular optical fibre. For the daisy-chain configuration in FIG. 2, the long cables 4 between blades 1 present enough time delay for electrical or optical gating to select the desired blade. Sensor reflectivities are selected to be low, for example 30%, to ensure sufficient power reaches the furthest sensors and this reduces the signal to noise ratio. When grating wavelengths coincide there will be a large (more than 50%) change in received power from more distant sensors.

Figure 4:
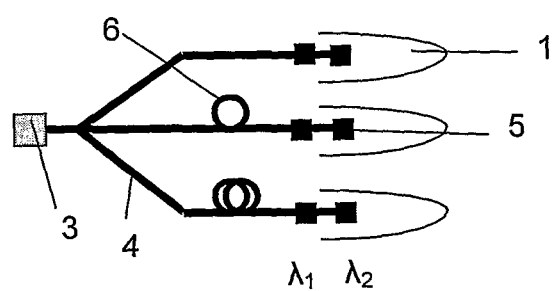
FIG. 4 is a schematic view of an arrangement of optical fibre strain sensors according to an embodiment of the invention.
Figure 5:
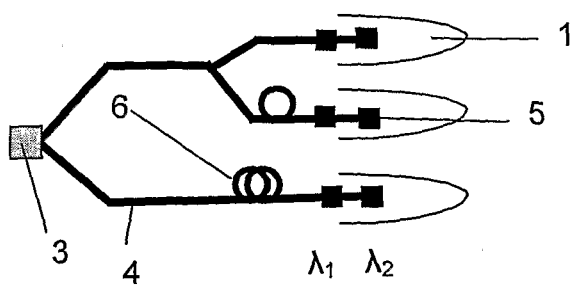
FIG. 5 is a schematic view of an arrangement of optical fibre strain sensors according to a further embodiment of the invention.
Figure 6:
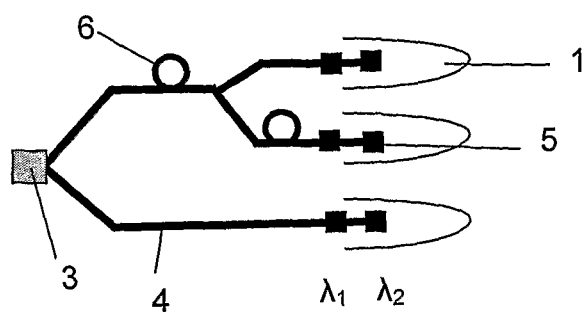
FIG. 6 is a schematic view of an arrangement of optical fibre strain sensors according to a yet further embodiment of the invention.

For good signal to noise performance using this hybrid system, the sensors 5 are located in different optical paths using a splitter, as shown schematically in FIG. 4. To ensure the signals from different blades are received in different time slots to be distinguishable, delay coils 6 of different lengths of optical fibre are introduced between the splitter and the sensors 5, either in the instrument 3, the blade 1 or the connecting cable 4. A number of different configurations are possible. For example, FIG. 4 shows the use of a three-way splitter and two different lengths of delay coil 6. FIG. 5 shows the use of two two-way splitters and two different lengths of delay coil 6. FIG. 6 shows the use of two two-way splitters and two delay coils 6, which can be of the same length. Using two two-way splitters, for optimum power distribution, the first splitter should send one third of the light to the first blade 1 and two thirds to the next two. The next splitter should divide the light equally so that the sensors 5 in each blade each receive one third of the light.

Although the invention has been described in the context of wind turbine blades, it is possible that the apparatus of the invention could be used in other fields. Such fields are not intended to be excluded from the scope of this disclosure. In particular, the invention allows the number of sensors in a WDM system to be increased without increasing the required operational bandwidth. Thus, for a 12,000 microstrain range with 12 sensors, it is possible to use only four different wavelength sensors in the described configuration of three groups, which fits within the available wavelength range of a typical WDM system. Thus, the sensors need not be located in respective blades or even in a wind turbine.

In summary, there is disclosed herein a system for the structural monitoring of blades 1 on a wind turbine. Each blade 1 has respective strain sensors 5. The system has a number of input connectors, which connect to the strain sensors 5 of respective blades 1. A single output connector connects to a data processing device 3 which processes signals from the strain sensors 5. The input connectors each have a signal path to the output connector that is different in length to the signal path from the other input connectors, such that signals from a given blade 1 can be identified at the data processing device 3 by the time of arrival of the signals. The system has the advantage that the each of the blades 1, including the sensors attached to it or embedded within it can be identical and therefore interchangeable.

The invention claimed is:

1. A method of manufacturing a wind turbine, the method comprising:
   providing a group of wind turbine blades, each blade comprising an optical fibre, each optical fibre incorporating a plurality of optical fibre Bragg grating sensors, with each of the sensors within a single fibre having a resonant wavelength in a distinct wavelength band, and at least some of the sensors in different fibres having a resonant wavelength in the same wavelength band;
   selecting from the group of wind turbine blades a subgroup of wind turbine blades and assembling the subgroup of wind turbine blades together to form a wind turbine;
   connecting each of the optical fibres of the wind turbine to a data processing device via a multiplexer and an optical output,
   wherein the data processing device is configured to process signals from fibre Bragg grating sensors and the multiplexer is configured to control the passage of signals from the optical fibres to the data processing device, such that signals from only one optical fibre are received at the data processing device at any given time.

2. A method of manufacturing a wind turbine as claimed in claim 1, wherein the optical fibres of each turbine blade in the group are substantially identical in terms of the resonant wavelengths of the sensors in the fibre.

3. A method or apparatus as claimed in claim 1, wherein the multiplexer comprises a signal path from each optical fibre to the optical output that is different in length to the signal path from the other optical fibres, such that signals from a given optical fibre can be identified at the optical output by the time of arrival of the signals.

4. Apparatus as claimed in claim 3, wherein the signal path between at least one optical fibre and the optical output comprises at least one delay coil of optical fibre to provide a predetermined length to the signal path.

5. A group of wind turbine blades comprising apparatus as claimed in claim 1 with each turbine blade comprising a respective optical fibre.

6. Apparatus for the structural monitoring of a plurality of blades on a wind turbine, the apparatus comprising:
- a plurality of optical fibres each for association with a respective turbine blade, each optical fibre incorporating a plurality of optical fibre Bragg grating sensors, with each sensor within a single fibre having a resonant wavelength in a distinct wavelength band;
- an optical output, which is connectable to a data processing device configured to process signals from fibre Bragg grating sensors and which has a signal path to each of the optical fibres; and
- a multiplexer in the signal path between the optical output and the optical fibres, wherein the multiplexer is configured to control the passage of signals from the optical fibres to the optical output, such that signals from only one optical fibre are received at the optical output at any given time.

* * * * *

UNITED STATES PATENT AND TRADEMARK OFFICE
CERTIFICATE OF CORRECTION

PATENT NO.       : 8,545,179 B2                                          Page 1 of 1
APPLICATION NO.  : 12/377957
DATED            : October 1, 2013
INVENTOR(S)      : Volanthen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this

Fifteenth Day of September, 2015

Michelle K. Lee
*Director of the United States Patent and Trademark Office*